United States Patent Office 3,427,607
Patented Feb. 11, 1969

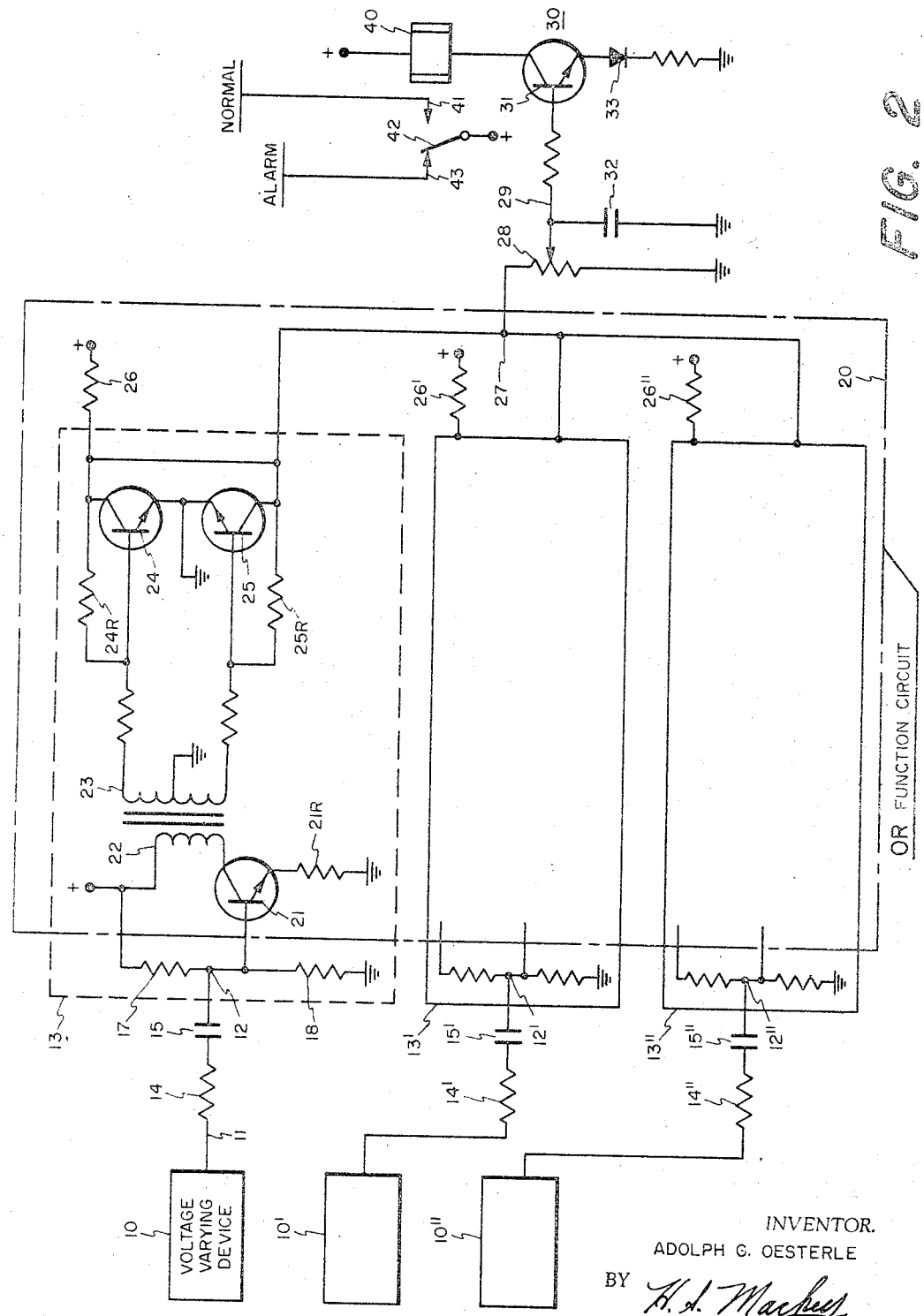

3,427,607
VOLTAGE DEVIATION ALARM SYSTEM
Adolph G. Oesterle, Wyckoff, N.J., assignor to General Precision Systems Inc., a corporation of Delaware
Filed Apr. 7, 1966, Ser. No. 540,982
U.S. Cl. 340—248          4 Claims
Int. Cl. H03k 5/20

The present invention relates to a performance monitoring and warning system for a plurality of voltage varying devices. In particular the present invention is a system for monitoring the output characteristics of each of two or more voltage varying devices, such as servo amplifiers, for example, in which each of the outputs so monitored normally bear a predetermined relation to each other. In the event that the output characteristics vary from the predetermined relation, warning of such variance is provided in the form of a fail-safe servo failure indicator.

One of the features of the present monitoring and warning or failure indicating system is a phase insensitive system that may monitor both alternating current (AC) voltages and/or direct current (DC) voltages, separately or in combination. The present invention finds particular utility in monitoring two or more servo amplifier systems each of which normally drive to a common null.

It is therefore an object of the present invention to provide a performance monitoring and warning system for monitoring the output voltage characteristics of a plurality of voltage varying devices.

Another object is to provide a performance monitoring and failure or warning system for monitoring the individual output voltage characteristics of a plurality of servo amplifiers in which the monitoring system is insensitive to phase difference in the output voltage of the servo amplifiers.

Another object is to provide a performance monitoring and failure or warning system for monitoring the output voltages of a plurality of voltage varying devices in which the monitoring system is insensitive to phase and the failure indicator is fail-safe.

These and other objects will become more apparent from reading the following detailed description with reference to the accompanying drawings in which:

FIG. 2 is a more detailed functional diagram showing the preferred circuit arrangement for the monitor.

Figure 1:
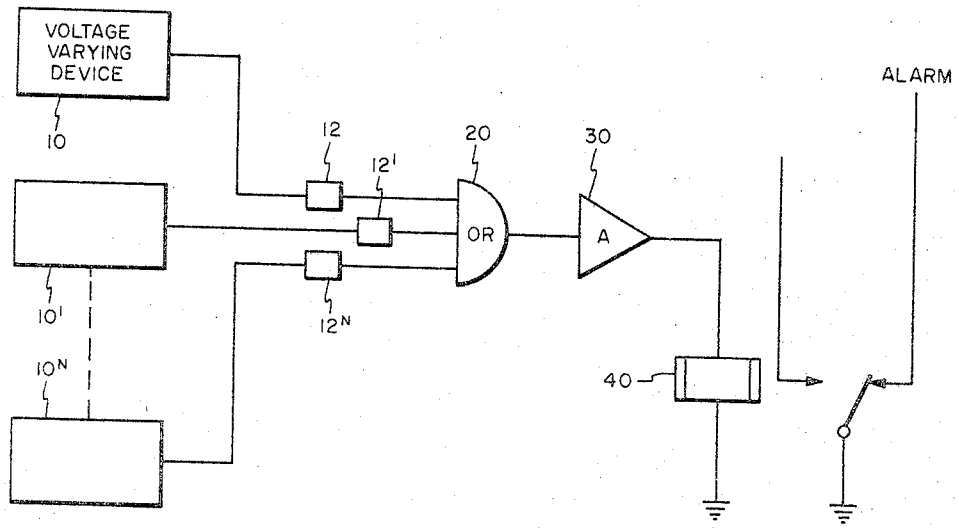
FIG. 1 is a functional diagram partly in block and partly in schematic form.

Referring in detail to FIG. 1, it will be seen that functionally the outputs of voltage varying devices 10, 10' and 10$^N$ are applied to individual equalization points 12, 12' and 12$^N$. The broken line between block 10' and 10$^N$ represents that other voltage varying devices may be included so that any number, in excess of two, may be connected through individual equalization circuits or points to circuit units which collectively function as an OR gate, represented by 20. The output of the OR gate 20 is amplified, such as by a conventional amplifier 30 and is then applied to a utilization or warning circuit which is represented by a relay 40 and its contacts. In order to provide a fail-safe warning or indicating system the warning, indicator or alarm circuit will become operative or energized when the relay becomes deenergized. The block-circuit arrangement in FIGS. 1 and 2 are illustrated with the relay 40 deenergized.

Referring to FIG. 2, let it be assumed that the blocks 10, 10' and 10" are all similar voltage varying devices such as servo amplifier circuits, each of which drive to a common null, for example. The block 13 shows circuit details that are represented by blocks 13' and 13". The points or junctions 12, 12' and 12" are voltage equalizing points, that is, the voltage output applied via lead 11 through isolating resistor 14 and coupling capacitor 15 is adjusted in value at junction 12 via action of the potential divider resistors 17 and 18 connected between a voltage source and ground. The value of the voltage at junction 12 is such as to keep transistor 21 biased to nonconduction when the voltage output of the voltage varying device is at the common null value.

The box formed by the long and short broken lines, labeled 20, particularly includes that part of the circuit which functions as an OR circuit. The output of the OR function circuit is applied to a sensitivity control circuit which is adjustable and, under normal operating conditions, provides an operating bias for normally holding transistor 31 of amplifier 30 conducting thereby holding the relay 40 energized when the characteristic or value of the voltage output of each voltage varying device is at the null value.

It will be understood that a description of the circuit in broken line blocks 13 will also be a description for the circuit represented by the blocks 13' and 13".

Let it be assumed that the voltage output of each voltage varying device (each of which may be a servo amplifier) is at the null value. The potential applied at junction 12 will be of sufficient value to hold transistor 21 cut off. With transistor 21 cut off the circuit including winding 22 is essentially open circuited and no current is induced in winding 23 (windings 22 and 23 being part of a transformer).

Thus transistor 21 serves as a switch and is effectively opened (made nonconductive) or closed (conductive) by the value of the output of the servo amplifier (voltage varying device) which controls the value of the adjusted potential at point 12. With transistor 21 nonconductive, the current path, including winding 22, the collector to emitter circuit of transistor 21 and resistor 21R, is open. Under this condition no current flows through winding 22 and there is no current induced in winding 23 andt he transistors 24 and 25 are biased to cut-off. With transistors 24 and 25 cut off, the parallel low resistance paths including the collector to emitter circuits of the respective transistors, each coupled to a common return or ground via their respective emitter terminals, are open.

The voltage source applied through resistors 26 finds a complete, relatively high resistance path, through junction 27 and resistor 28, to ground. The high resistance paths through resistors 24R and 25R provide bias which is applied to the base of the respective transistors 24 and 25 which bias normally holds the transistors cut off unless such bias is overcome by voltage from current induced in the winding 23, as will be described below.

Because of the value of resistor 28 relative to the value of resistor 26, the potential at the adjustable arm contact 29 is relatively high and of sufficient value to develop a bias for holding transistor 31 normally conducting. With transistor 31 conducting, relay 40 is held energized. The charge across capacitor 32 is held substantially constant by adjustment of the arm 29 on resistor 28 when the transistors 24 and 25 are cut off.

Let it be assumed that the voltage output applied via lead 11 increases above the null value sufficient to increase the potential at junction 12 so as to cause transistor 21 to conduct. (The following description and effect will occur if any one or all the voltage outputs increase above the null value.)

When conducting, transistor 21 electrically completes a circuit for passing current through winding 22. Current is then induced in winding 23, the center tap of which is connected to ground. The extreme terminals of winding 23 are coupled for applying a driving bias to the base of transistors 24 and 25 which overcomes the normal cut-off so that the transistors will alternately conduct on opposite halves respectively of the alternating current induced into winding 23.

This essentially provides a full wave rectifier circuit since one transistor, for example 24, is driven to conduct during one half of the AC excursion induced in the winding 23, while the other transistor, for example 25, is held cut off and the other transistor, for example 25, is driven to conduct during the other half of the AC excursion induced in the windings 23 while the transistor 24 is held cut off. Thus, alternate, parallel low resistance paths are electrically completed for by-passing the high resistance path including resistor 28 thereby reducing the junction 27 to substantially ground potential and essentially reducing the voltage drop across resistor 28 to substantially zero. With the voltage drop across resistor 28 reduced to substantially zero the potential at the adjustable arm 29 is essentially reduced to the potential at junction 27 or, essentially ground and the driving bias heretofore applied to the base of transistor 31 falls so that transistor 31 goes to cut-off. The diode 33 insures that transistor 31 will go to cut-off even through the potential across resistor 28 remains somewhat above ground but below that potential normally applied across resistor 28 when the transistors 24 and 25 are nonconducting.

The RC time constant of the resistance of resistors 26 and 28 and capacitor 32 is such that the charge across capacitor 32 is normally constant and prevents cut off of transistor 31 in the event of momentary voltage variation at the output of the voltage varying device or in the event of voltage level fluctuations caused by line voltage fluctuations.

The fail-safe warning circuit includes a normally energized relay 40 which holds contacts 41/42 closed when energized. When deenergized contacts 43/42 close and activate a warning or alarm circuit.

Thus it will be seen that each of the blocks 13, 13′ and 13″ include a signal equalizing circuit network, an amplifier, a full wave rectifier circuit network and a connection to a source of current through a summing resistor such as resitor 26, the full wave rectifier essentially providing alternate paths to a common return.

The circuit including the primary winding 22 of the transformer and the full wave rectifier circuit of each monitoring unit are coupled to their output to a common junction and function as an OR circuit.

Since the rectifier is a full wave rectifier the monitoring unit is insensitive to the phase of the output signal applied to junction 12.

Figure 3:
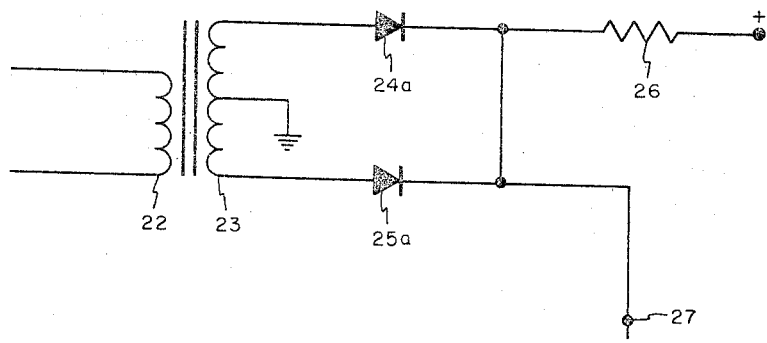
FIG. 3 is an alternate circuit arrangement for the monitor.

FIG. 3 illustrates an alternate circuit arrangement of a full wave rectifier, without limiting the present invention to only the two forms shown.

As illustrated in FIG. 3, the transistors 24 and 25 are replaced with diodes 24a and 25a. The remainder of the rectifier circuit being substantially the same as that illustrated in FIG. 2 except for the bias developing and feedback resistors 24R and 25R.

Thus the present invention has been described with reference to the drawings illustrating the preferred embodiment and an alternate circuit arrangement. Obviously other circuit arrangements may be made as by substitution and/or rearrangement of components, as will be familiar to those skilled in the art without departing from the spirit of the invention.

What is claimed is:

1. Apparatus for monitoring the performance of and for warning of failure of at least one of at least two servo amplifiers, each of which normally drive to a common null output including;

means individual to each servo amplifier for adjusting the output of the respective servo amplifier to a predetermined value when the output is at said common null value, an OR gate having at least two inputs and an output said OR gate including, at least two rectifier circuits, each respective rectifier circuit coupled to a respective input of said at least two inputs and each rectifier circuit coupled to said output, means for coupling the output of each respective said adjusting means to a respective input of said at least two inputs for holding the respective rectifier circuit nonconductive when the output of the respective adjusting means is at said predetermined value and for driving said rectifier circuit when the output of the respective adjusting means is at a value other than said predetermined value, a potential divider circuit including first and second resistors connected in series between a circuit supply and a return, said output of said OR gate connected to a junction between said first and second resistors so that when any one of said rectifier circuits are conducting the potential at said junction is the value of said return and when all of said at least two rectifier circuits are nonconducting the potential at said junction is substantially above the value of said return, means coupled to said potential divider between said junction and said return for developing a driving potential when the potential at said junction is above said return, and means responsive to said driving potential for indicating the output of each of said at least two servo amplifiers is at said common null.

2. Apparatus as in claim 1 and in which each rectifier circuit of said at least two rectifier circuits is a full wave rectifier.

3. Apparatus as in claim 1 and in which each rectifier circuit of said at least two rectifier circuits is a full wave rectifier and each said means for coupling includes the primary coil of a transformer, and the secondary coil of said transformer has a center tap coupled to said common return and said secondary coil is part of said full wave rectifier.

4. Apparatus for monitoring the performance and for warning of failure of at least one of at least two voltage varying devices each having individual voltage outputs including:

a voltage value sensing circuit individual to each voltage varying device, means individual to each respective voltage varying device for adjusting the normal output voltage to a common predetermined value, a transformer having a primary and a secondary winding, switch means coupled to said primary winding and responsive to the voltage output of said adjusting means for open circuiting said primary winding when the voltage output of said adjusting means is at said predetermined value and for closing the circuit including said primary winding when the voltage output of said adjusting means differs from said predetermined value, said secondary winding including a center tap coupled to a common return, first and second transistors each having a base, an emitter and a collector, one extreme of said secondary winding being coupled to the base of said first transistor for holding said first transistor cut off when said output of said adjusting means is at said common value, the other extreme of said secondary winding being coupled to the base of said second transistor for holding said second transistor cut off when said output of said adjusting means is at said common value, a first junction common to each said voltage value sensing circuit, a direct current source, a first resistor connected between said direct current source and said first junction, the collectors of said first and second transistors being connected to said first junction, the emitters of said first and second transistors being connected to said common return, a second resistor connected between said first junction and said common return, means for deriving a second predetermined voltage from said second resistor, when said voltage output of said adjusting means is at said predetermined value, a relay circuit including second switch means, and means for applying said second predetermined voltage to said second switch means for holding said relay circuit closed when the voltage output of said adjusting means is at said predetermined value.

References Cited

UNITED STATES PATENTS

| | | | |
|---|---|---|---|
| 2,782,404 | 2/1957 | Bergman | 340—253 |
| 3,098,999 | 7/1963 | Clapper | 340—248 |
| 3,210,749 | 10/1965 | Magor | 340—181 XR |
| 3,252,058 | 5/1966 | Close. | |

THOMAS B. HABECKER, *Primary Examiner.*

D. K. MYER, *Assistant Examiner.*

U.S. Cl. X.R.

307—235; 328—148